UNITED STATES PATENT OFFICE.

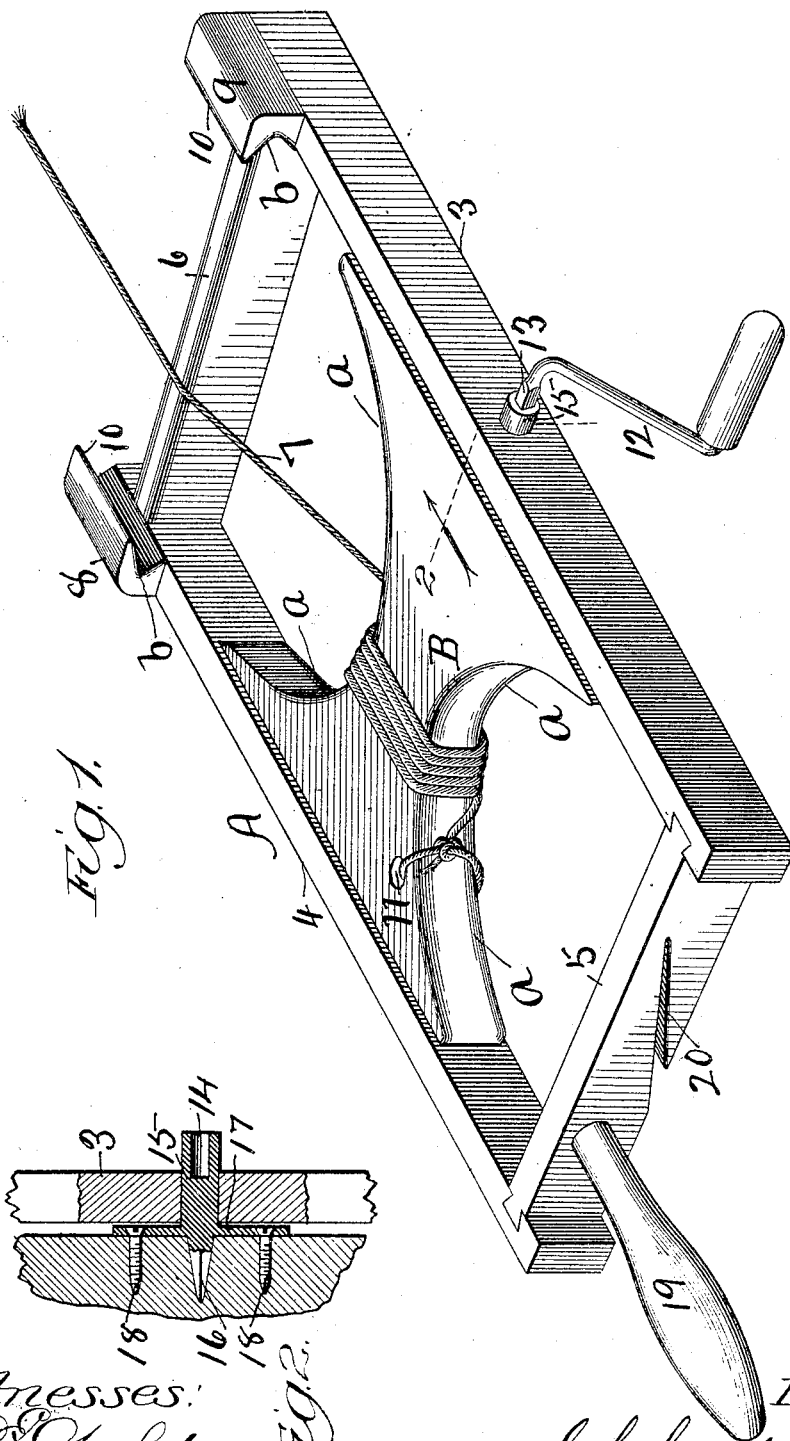

SIGMUND C. GOLDENBERG, OF CHICAGO, ILLINOIS.

CLOTHES-LINE REEL.

No. 836,444.

Specification of Letters Patent.

Patented Nov. 20, 1906.

Application filed March 11, 1905. Serial No. 249,600.

*To all whom it may concern:*

Be it known that I, SIGMUND C. GOLDENBERG, a citizen of the United States, residing at Chicago, in the county of Cook and State of Illinois, have invented new and useful Improvements in Clothes-Line Reels, of which the following is a specification.

This invention relates to improvements in a line-reel, and more especially to clothes-line reels, and has for its object to provide a device of this character that is simple, cheap, and easily manipulated.

In the drawings, Figure 1 is a view in perspective of a device embodying the improved features. Fig. 2 is a sectional detail on line 2, Fig. 1, looking in the direction indicated by the arrow.

A represents a rectangular holding-frame consisting of the parallel side bars 3 and 4 and the connecting end bars 5 and 6. A line-reel B is rotatably mounted in the frame A and consists of a flat body in contour something like the letter X, the respective ends being curved out, as at $a$, and providing an increasing winding-surface from the center outward and also enlarges the line-holding space. This form of a reel-body or spool also prevents the line from being jammed against the side bars and thereby preventing a free manipulation thereof in the operation of winding or unwinding. With this form of a reel-body the coils in winding can be laid on uniformly even and the liability to cramp avoided. The companion side bars are provided at the end and upper side at which the line 7 is run off with guard-pieces 8 and 9, grooved out on the inner sides, as at $b$, and providing the overhanging edges 10. This guard arrangement serves the purpose of confining the running line or cord within a proper working limit and prevents the same from slipping off at either side. The reel-body is provided with an aperture 11, through which the inner end of the line may be run in properly fastening the same.

The reel is rotated by means of a hand-crank 12, having its square end 13 inserted in a corresponding socket 14, formed in the outer end of a stub-shaft 15, journaled in one of the side bars of the frame. The inner end 16 of the stub-shaft is pointed and inserted in the reel-body, as shown in Fig. 2. The pointed end of this shaft may be squared in cross-section, so as to provide a better holding-ground, and is further secured to the reel-body by means of a flange or plate 17 and screws 18. A hand-grasp 19 may be placed in the side bar of the frame on the opposite side from that of the manipulating-crank or in the inner end cross-bar 5 of the frame, as shown.

One of the end cross-bars of the frame is provided with a diagonal notch 20 of considerable depth, which gradually narrows in the direction of the bottom, so that when a bight of the line is inserted therein it will be subjected to a drawing wedging action and lock the line at any point against being run out or wound up until properly released.

In practical working the reel is ordinarily rotated in the one direction by drawing out the line. When the required length has been run out, the line is inserted in the notch and the same locked against either being run out or wound up by means of the hand-crank.

The device will be found very convenient for handling a trolling-line in fishing.

The frame and reel-body will ordinarily be composed of wood, thus protecting the line from corrosion, as the same cannot come in contact with any metal surfaces.

Having thus described my invention, what I claim is—

In a device of the class described, a rectangular frame comprising companion side bars and joining end bars, a winding reel-body mounted therein, the guide-pieces secured to the ends of said side bars, means for locking the line against being run in or out, and means for rotating said reel-body.

In testimony whereof I affix my signature in presence of two subscribing witnesses.

SIGMUND C. GOLDENBERG.

Witnesses:
L. B. COUPLAND,
G. E. CHURCH.